Sept. 27, 1927.  J. BORNSTEIN  1,643,919
WINDSHIELD WIPER
Filed March 22, 1927  2 Sheets-Sheet 1
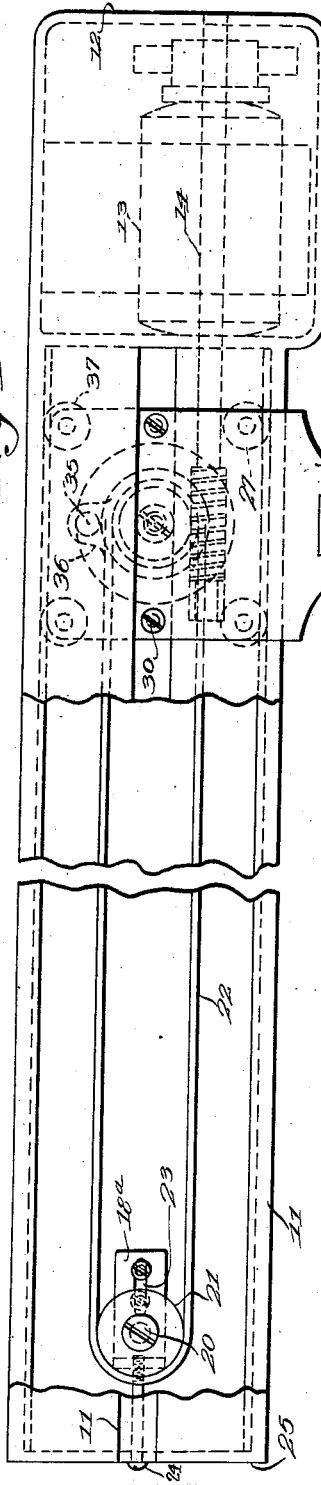
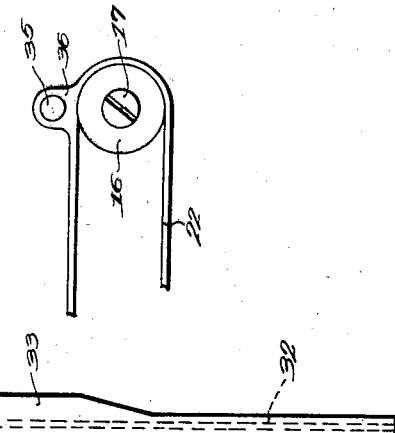
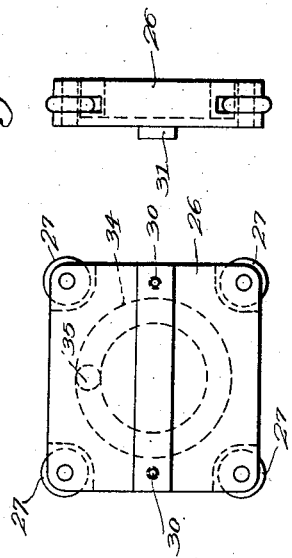

Sept. 27, 1927.  J. BORNSTEIN  1,643,919
WINDSHIELD WIPER
Filed March 22, 1927    2 Sheets-Sheet 2
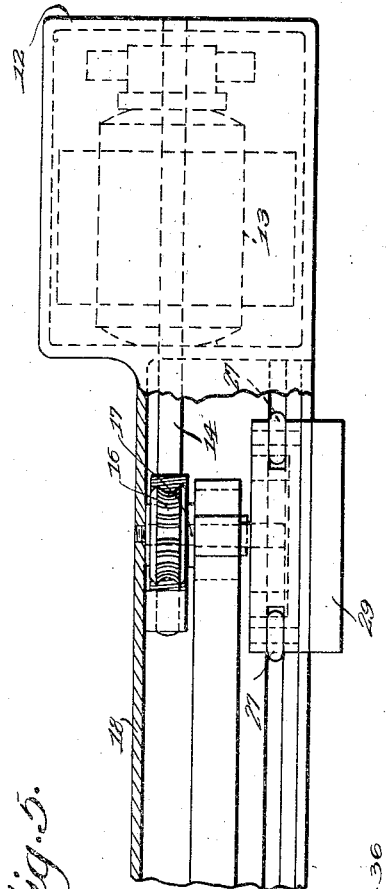
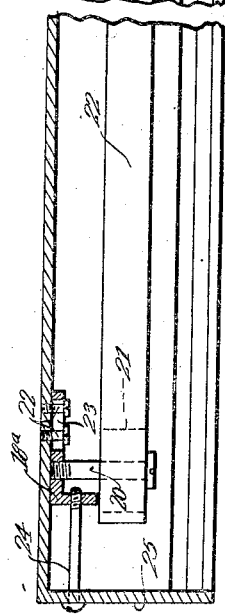
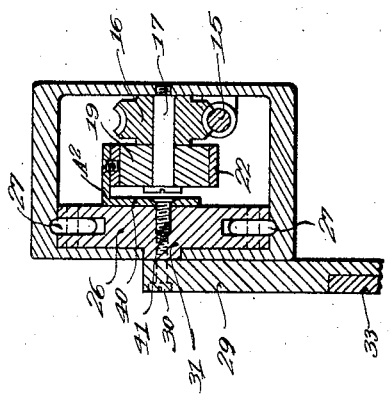
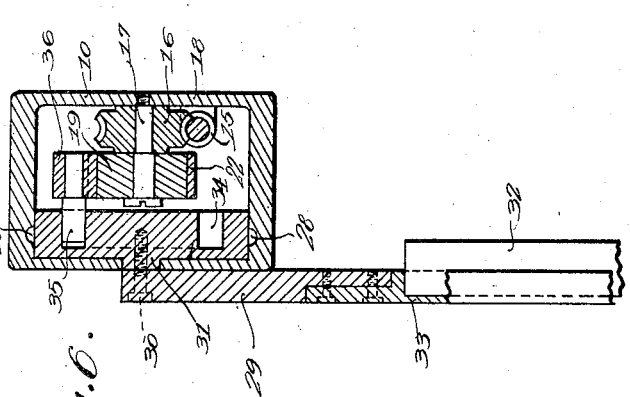
Inventor
Joseph Bornstein
Atty Patented Sept. 27, 1927.

1,643,919

UNITED STATES PATENT OFFICE.

JOSEPH BORNSTEIN, OF DORCHESTER, BOSTON, MASSACHUSETTS.

WINDSHIELD WIPER.

Application filed March 22, 1927. Serial No. 177,447.

This invention relates to a windshield wiper adapted for use on vehicles, such as automobiles, motor boats, aeroplanes, or street cars.

An object of the invention is the provision of a wiper adapted to be moved periodically across the entire width of a windshield of a vehicle in a horizontal manner.

A further object of the invention is the provision of a wiper adapted to be moved across a windshield through the instrumentality of a belt, chain or other flexible element having such a flexible connection with a carriage which supports the wiper that the wiper is moved to the end of its path in a straight line and after a brief period of rest, said wiper is then returned along the same path.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a front view in elevation of the wiper and operating means therefor, Figure 2 is a view in elevation of the carriage for the wiper, Figure 3 is an end view in elevation of the carriage, Figure 4 is a fragmentary view in elevation of the driving belt and pulley, Figure 5 is a plan view of the wiper and operating mechanism therefor partly in section, Figure 6 is a central vertical section through one of the pulleys and carrier.

Referring more particularly to the drawings, 10 designates a frame which is substantially rectangular in cross section and has a longitudinal slot 11 in the front wall thereof. At one end of the frame is formed a casing 12 which houses a motor 13 connected in any well known manner with a source of current supplied by the battery associated with the vehicle. The motor directly drives a shaft 14 which has a worm 15 in mesh with a worm gear 16.

An axle 17 is secured to the rear wall 18 of the frame and rotatably supports the gear 16 and a pulley 19. A second axle 20 is secured to a bracket 18ª fixed to the rear wall and rotatably supports a pulley 21. A belt 22 is trained over the pulleys 19 and 21 and driven by a pulley 19 which is rigid with the gear 16. The bracket 18ª is adjusted by means of set screws received by a slot 23 and a screw 24 carried by an end wall 25 of the frame.

A carriage 26 is provided with pairs of rollers 27 riding in tracks 28 formed in the frame 10 so that the carriage may be moved longitudinally of the frame and windshield. A plate 29 depends from the carriage and is secured at 30 to a boss 31 projecting through the slot 11 of the frame. A wiper 32 formed of any suitable material is secured to an arm 33 which in turn is connected to the plate 29.

The carriage has an annular groove 34 which receives the free end of a pin 35 which is secured to a lug 36 attached rigidly to the belt 22.

The operation of my device is as follows: The motor 13 is energized by the current from the battery which is associated with the engine of the vehicle and thus causes rotation of the shaft 14 and worm gear 16. Since the worm gear is rigid with the pulley 19 said pulley is revolved, causing the belt 22 to travel over the pulleys 19 and 21 carrying the pin 35 longitudinally of the frame and in opposite directions. Since the pin is rigid with the belt the speed of the pin is uniform and is identical with that of the belt 22.

The pin 35 has its free end seated within the annular groove 34 of the carriage 26 and as the pin is carried towards the left hand end of the frame by the belt it will engage the side wall of the groove in the carriage and move the carriage towards the left hand end of the frame until it reaches the end of its path of travel through the frame. At this time the carriage remains stationary while the free end of the pin is moved substantially 180° in the groove when it will engage the side of the groove and move the carriage in the opposite direction. When the carriage reaches the right hand end of its travel the free end of the pin will then move through 180° of the groove and engage the side of the groove, thereby causing the carriage to be moved in the opposite direction.

It will be seen from the above construction that a simple, efficient and noiseless windshield wiper is had and which may be moved across the entire length of the windshield in order to provide an extended vision for the driver of the vehicle. Such a vehicle may be a motor boat, an automobile, aeroplane, or street car and in any event a motor 13 will be set in operation by a source of current associated with the vehicle or if the circumstances may be such that it may be necessary to cause rotation of the shaft 42 through a system of gearing operated from some moving part of the vehicle.

It is to be noted that whenever the limitation belts or chains are employed in the specification and claims that it is intended to designate some flexible driving means which is trained over pulleys or sprockets and driven by at least one of the revoluble members.

I claim:

1. Operating means for a windshield wiper comprising a supporting frame, a pair of spaced revoluble members, an endless flexible member trained over said members, means for rotating one of the revoluble members, a carriage mounted for longitudinal movement of the frame and provided with an annular groove, a pin carried by the endless means and having the free end thereof received within the groove.

2. Operating means for a windshield wiper comprising a supporting frame, a pair of spaced revoluble members, an endless flexible member trained over said members and provided with a laterally projecting lug, means for rotating one of the members in one direction, said frame being provided with a plurality of tracks, a carriage having rollers mounted in the tracks whereby said carriage may be moved longitudinally of the frame, said carriage being provided with an annular groove at the inner face thereof, a pin carried by the lug and having the free end thereof projecting into the groove.

3. Operating means for a windshield wiper comprising a supporting frame, a pair of revoluble members, an endless flexible means trained over said members, means for rotating one of the members, a member having an annular channel, said member being slidably mounted in the frame, means connected with the flexible member and having operative engagement with the channel for moving the member in opposite directions longitudinally of the frame while permitting a period of rest for the member at the opposite ends of the path of movement of the member.

JOSEPH BORNSTEIN.